(12) United States Patent
Liverance

(10) Patent No.: US 8,843,915 B2
(45) Date of Patent: Sep. 23, 2014

(54) SIGNATURE-BASED UPDATE MANAGEMENT

(75) Inventor: Fletcher Liverance, Kent, OH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 253 days.

(21) Appl. No.: 13/193,483

(22) Filed: Jul. 28, 2011

(65) Prior Publication Data

US 2013/0031539 A1   Jan. 31, 2013

(51) Int. Cl.
| | |
|---|---|
| *G10L 19/00* | (2013.01) |
| *G06F 15/16* | (2006.01) |
| *G06F 9/00* | (2006.01) |
| *G06F 15/177* | (2006.01) |
| *H04L 9/32* | (2006.01) |
| *G06F 11/30* | (2006.01) |
| *G01R 31/28* | (2006.01) |
| *G06F 9/44* | (2006.01) |
| *G06F 9/445* | (2006.01) |
| *G06F 11/00* | (2006.01) |
| *G06F 21/57* | (2013.01) |

(52) U.S. Cl.
CPC .. *G06F 9/44* (2013.01); *G06F 8/61* (2013.01); *G06F 8/65* (2013.01); *G06F 21/57* (2013.01)
USPC ........ 717/171; 704/200.1; 709/203; 709/211; 709/227; 713/2; 713/160; 713/165; 713/168; 713/169; 713/176; 713/188; 713/189; 714/732; 717/168; 717/172; 717/176; 717/177; 717/178; 726/23; 726/24

(58) Field of Classification Search
CPC ......... G06F 8/65; G06F 11/2294; G06F 9/44; G06F 9/45558; G06F 17/30067; G06F 21/00; G06F 21/10; G06F 21/51; G06F 21/64; G06F 21/577; G06Q 20/382; G06Q 20/3823
See application file for complete search history.

(56) References Cited

U.S. PATENT DOCUMENTS

| | | | | |
|---|---|---|---|---|
| 6,279,153 | B1* | 8/2001 | Bi et al. ..................... | 717/171 |
| 6,574,657 | B1* | 6/2003 | Dickinson ................. | 709/203 |
| 7,535,905 | B2* | 5/2009 | Narayanan et al. ......... | 713/168 |
| 7,711,760 | B2* | 5/2010 | Williams .................... | 713/165 |
| 7,889,181 | B2* | 2/2011 | Bi et al. ..................... | 709/211 |
| 7,925,888 | B1* | 4/2011 | Nachenberg ............... | 713/188 |
| 8,174,991 | B1* | 5/2012 | Trivedi ...................... | 714/732 |
| 2002/0194313 | A1* | 12/2002 | Brannock .................. | 717/176 |
| 2003/0167407 | A1* | 9/2003 | Howard ..................... | 713/201 |
| 2003/0212992 | A1* | 11/2003 | Ronning et al. ............ | 717/178 |
| 2003/0226139 | A1* | 12/2003 | Lee ............................ | 717/176 |
| 2004/0158456 | A1* | 8/2004 | Prakash et al. ............ | 704/200.1 |
| 2005/0149923 | A1* | 7/2005 | Lee ............................ | 717/172 |
| 2005/0220095 | A1* | 10/2005 | Narayanan et al. ........ | 370/389 |
| 2006/0047952 | A1* | 3/2006 | Van Den Heuvel et al. .. | 713/160 |
| 2006/0185017 | A1* | 8/2006 | Challener et al. ......... | 726/24 |

(Continued)

FOREIGN PATENT DOCUMENTS

| | | |
|---|---|---|
| CN | 101425114 A | 5/2009 |
| EP | 1936497 A2 | 6/2008 |

*Primary Examiner* — Don Wong
*Assistant Examiner* — Anibal Rivera

(57) ABSTRACT

A computing device to determine whether to update using a computer file by generating a file signature for that computer file based on its file header information and comparing the file signature to a collection of file signatures for updates already applied for matches.

23 Claims, 6 Drawing Sheets

(56) References Cited

U.S. PATENT DOCUMENTS

| | | | |
|---|---|---|---|
| 2006/0271688 A1* | 11/2006 | Viger et al. | 709/227 |
| 2007/0022420 A1* | 1/2007 | Yamamoto et al. | 717/177 |
| 2008/0256527 A1* | 10/2008 | Lee et al. | 717/168 |
| 2010/0058432 A1* | 3/2010 | Neystadt et al. | 726/23 |
| 2010/0125733 A1* | 5/2010 | Kim et al. | 713/169 |
| 2011/0087872 A1* | 4/2011 | Shah et al. | 713/2 |
| 2012/0124357 A1* | 5/2012 | Zimmer et al. | 713/189 |
| 2012/0179913 A1* | 7/2012 | Kirk et al. | 713/176 |
| 2012/0304244 A1* | 11/2012 | Xie et al. | 726/24 |

\* cited by examiner

SIGNATURE-BASED UPDATE MANAGEMENT

BACKGROUND

It is often desirable to provide computer systems with software updates designed to fix problems (e.g., security vulnerabilities) or to improve the usability or performance on the computer systems. A computer system typically receives an update from a server and then installs the update.

DETAILED DESCRIPTION

The present subject matter is now described more fully with reference to the accompanying figures, in which several embodiments of the subject matter are shown. The present subject matter may be embodied in many different forms and should not be construed as limited to the embodiments set forth herein. Rather these embodiments are provided so that this disclosure will be complete and will fully convey principles of the subject matter.

A client system boots up and broadcasts a message to a predetermined port requesting an identifier of an update service. The client system receives the identifier in response to the broadcast message, contacts the update service using the identifier, and receives header information of available updates. The client system generates signatures for the available updates based on the header information, and determines whether an update has been applied by searching the signature of that update in signatures of updates that have already been applied. The administrator may rely on the file header information to manage the updates without using server side update management tools or maintaining separate update naming schemes, and thereby the management of updates may be simplified.

Figure 1:
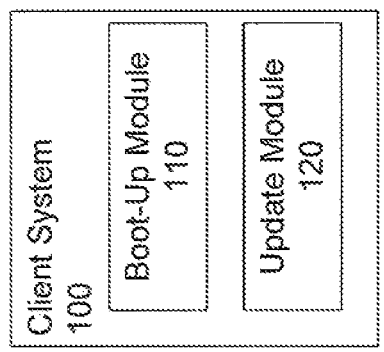
FIG. 1 is a diagram of an embodiment of a structure for a client system that manages updates.

FIG. 1 illustrates one example structure of a client system 100 for managing updates for its components. Example updates include operating system updates, software application updates, and device driver updates, to name a few. As shown, the client system 100 is a computer system that includes a boot-up module 110 and an update module 120. When the client system 100 is powered up, the boot-up module 110 is configured to automatically determine a network address (e.g., an Internet Protocol (IP) address) of the client system 100 and an identifier (e.g., a Uniform Resource Locator (URL), an IP address of an update service at which the client system 100 can obtain software updates. To determine the network address of the client system 100, the boot-up module 110 broadcasts a message on a connected computer network to request a network address from an available network configuration server (e.g., a DHCP server). The boot-up module 110 receives from the server a responding message containing the network address, and parses the responding message to determine the network address. To determine the identifier of the update service, the boot-up module 110 broadcasts a message containing identification information of the client system 100 on a connected computer network to a predetermined port (e.g., a high-level port between 1024 and 65535, such as the port 5578). Examples of the identification information of the client system 100 in the broadcast message include a network address, a Media Access Control (MAC) address, and model information, to name a few. The boot-up module 110 receives from a server a responding message containing the identifier, and parses the responding message to determine the identifier. In one example, the boot-up module 110 is configured to examine the responding message from the network configuration server for a static tag indicating an identifier of an update service, and if such a static tag is present, then the boot-up module 110 parses the message for the identifier without broadcasting the message containing the identification information. The boot-up module 110 passes the identifier to the update module 120 for it to communicate with the update service.

The update module 120 uses the identifier to contact the update service for available updates. To obtain available updates, the update module 120 transmits a request for available updates to the update service as identified by the identifier, and receives from the update service information about the available updates in response. In one example, the update module 120 generates signatures (also called update signatures) for available updates based on the received information. Example information includes file header information such as file name, size, creation/last modification date and time, permissions, and metadata file type, tags). To generate a signature for an available update, the update module 120 applies an algorithm such as a hashing algorithm to the information of the update. The update module 120 maintains a collection of signatures for updates already applied (or installed) in the client system 100, and determines whether an update has been applied in the client system 100 by searching the signature of that update in the collection for matches. If the signature has no match in the collection, the update module 120 determines that the update has not been applied and applies the update. Otherwise, if the signature has at least one match in the collection, the update module 120 determines that the update has already been applied and thus does not need to be applied again.

Figure 2:
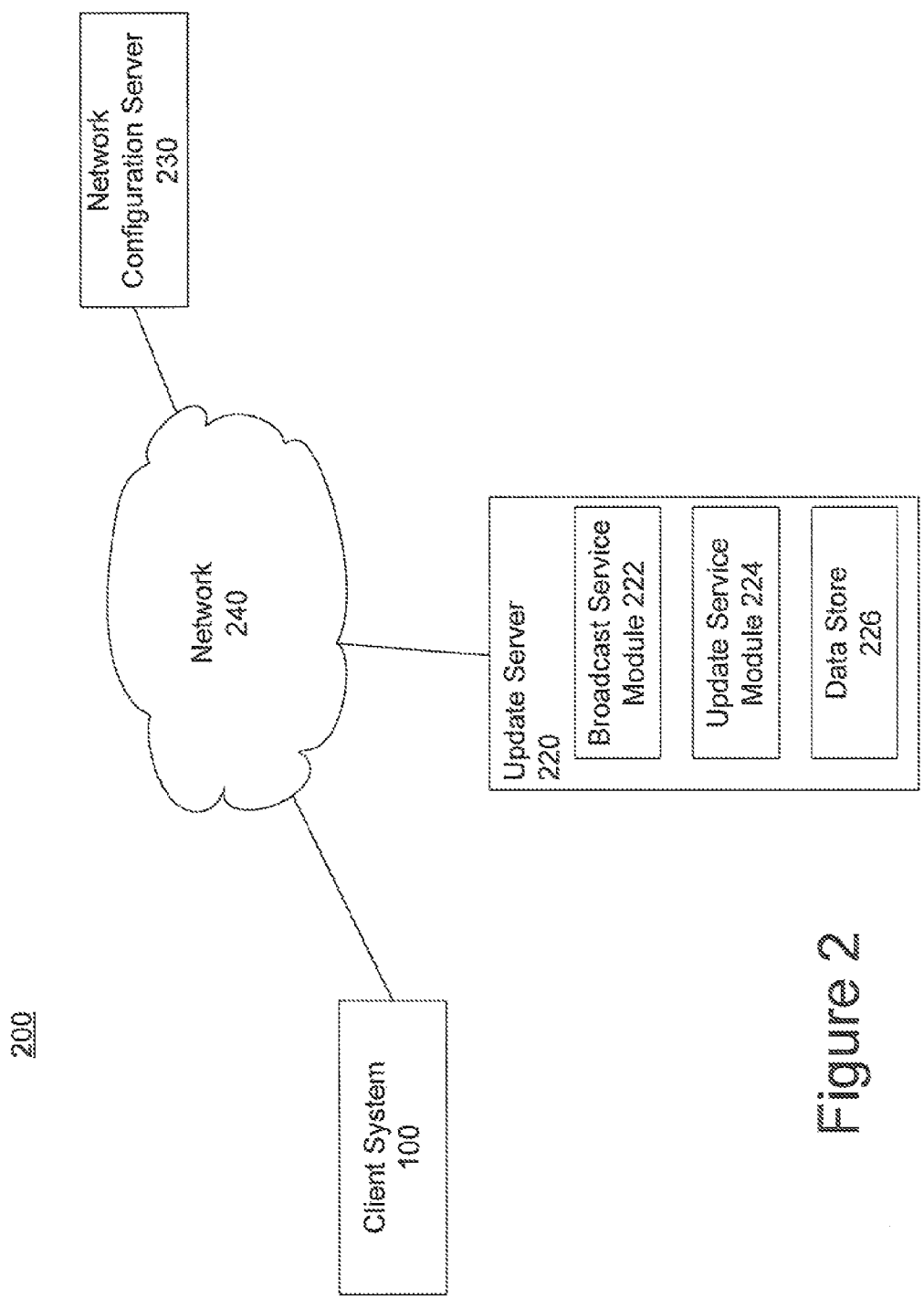
FIG. 2 is a diagram of an embodiment of a network environment including the client system shown in FIG. 1.

FIG. 2 illustrates one example network environment 200 for the client system 100 to manage updates. As shown, the network environment 200 includes the client system 100, an update server 220, and a network configuration server 230, all connected to a network 240. One of each type of entity is illustrated for clarity in the present embodiment.

The update server 220 is a computer system that can include a broadcast service module 222, an update service module 224, and a data store 226. The broadcast service module 222 provides a broadcast service that listens to a predetermined port for broadcast messages. Once a broadcast message is received from a computer system (e.g., the client system 100), the broadcast service module 222 generates a message including a URL where an update service is provided, and transmits the message to the computer system in response. In one example, the broadcast service module 222 authenticates the broadcast message based on identification information included therein, and transmits the message including the URL upon successful authentication. The update service module 224 provides an update service that listens for messages requesting available updates, and provides information about the available updates (e.g., header information of computer files containing update information) in response. In one example, the update service module 224 is a file server (e.g., a Hypertext Transfer Protocol (HTTP) file server, a File Transfer Protocol (FTP) file server) configured to provide computer files or their header information in response to requests. As a result, the administrator may store update packages in the file server without knowledge of how updates are triggered or administration using server side update management tools, and thereby the management and distribution of updates both may be simplified. In one embodiment, the update service (e.g., the file server) may be relocated (e.g., to a different computer system) and the broadcast service module 222 may rediscover the new location of the update service and provide client systems 100 with a new URL of the update service.

The data store 226 stores data used by the update server 220. Examples of the data stored in the data store 226 include computer files containing software updates for client systems 100. The data store 226 may be a file system or a database stored on a non-transitory computer-readable storage medium.

In one example, an installation package can be locally or remotely installed onto the update server 220 by a user or administrator to set up the broadcast service module 222, the update service module 224, and the data store 226. In another example, the installation package can be pre-installed in the update server 220 by the manufacturer.

Figure 3:
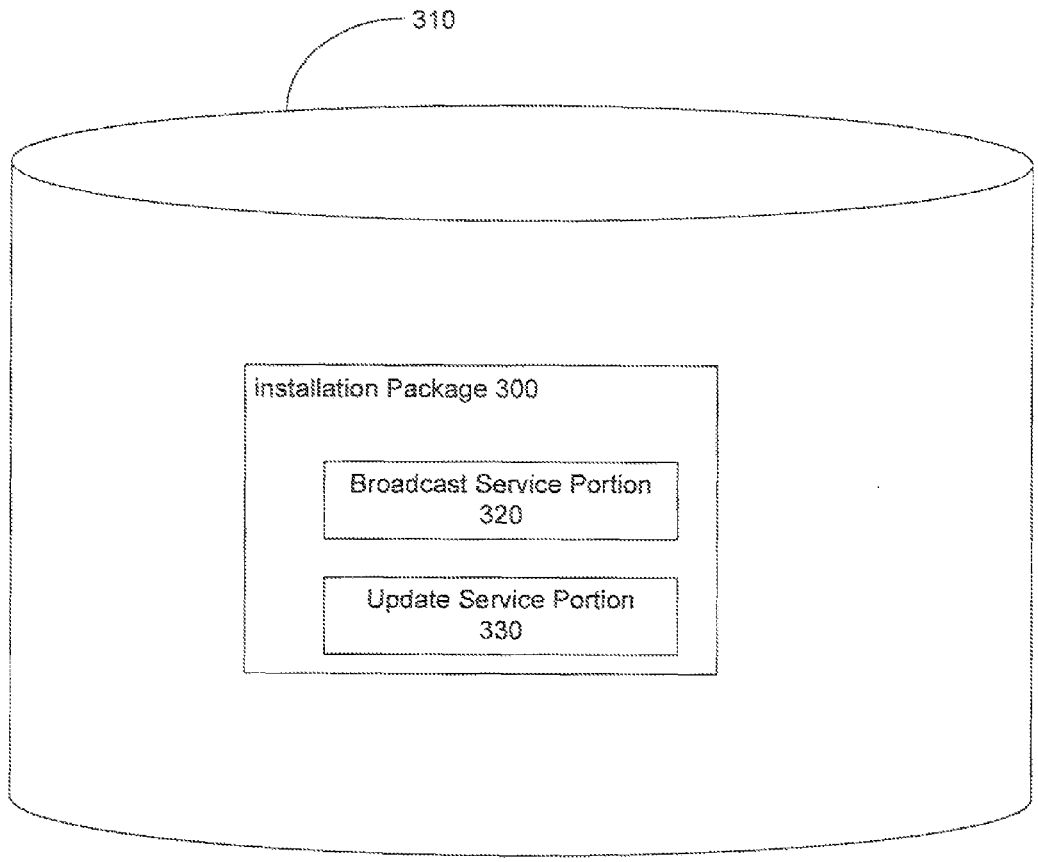
FIG. 3 is a diagram of an embodiment of a storage medium storing an installation package.

Referring to FIG. 3, a block diagram showing an example installation package 300 stored in a non-transitory computer-readable storage medium (e.g., compact disk read-only memory (CD-ROM), DVD) 310. As shown, the installation package 300 includes a broadcast service portion 320 for setting up the broadcast service module 222, an update service portion 330 for setting up the update service module 224 and storing software updates in the data store 226. In one example, the update service portion 330 can include a storage device for storing the software updates. Referring back to FIG. 2, during installation, the installation package 300 sets up the broadcast service module 222, the update service module 224, and the data store 226, and starts the broadcast service and the update service. In addition, the installation package 300 queries the update server 220 and/or the network configuration server 230 to determine a URL where the update service can be resolved at, and configures the broadcast service to respond to requests with the URL of the update service.

The network configuration server 230 automatically configures computer systems (e.g., the client system 100) connected to the network 240 such that the computer systems can communicate with other computer systems (e.g., the update server 220) on the network 240. One example of the network configuration server 230 is a Dynamic Host Configuration Protocol (DHCP) server. In response to a message from a computer system (e.g., the client system 100) requesting a network address, the network configuration server 230 assigns a network address to the computer system, and transmits to the computer system a responding message containing the assigned network address. In one example, the network configuration server 230 can be configured to include in the responding message an identifier of an update service in the network 240 identified by a static tag.

The network 240 is configured to connect the client system 100, the update server 220, and the network configuration server 230. The network 240 may be a wired or wireless network. Examples of the network 240 include an intranet, a WiFi network, a WiMAX network, a mobile telephone network, the Internet, or a combination thereof.

Figure 4:
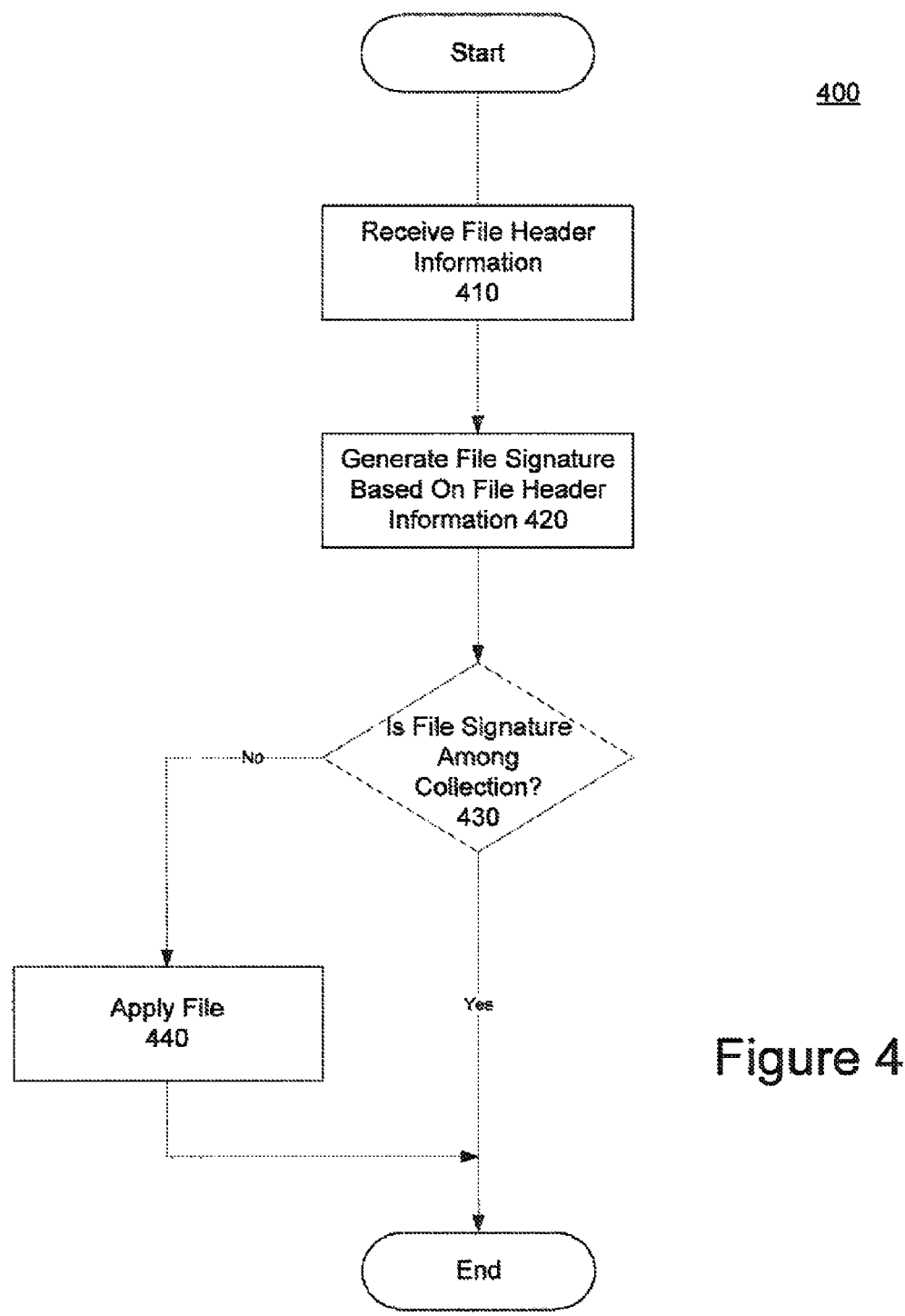
FIGS. 4 and 5 are diagrams of embodiments of methods for managing updates.
Figure 5:
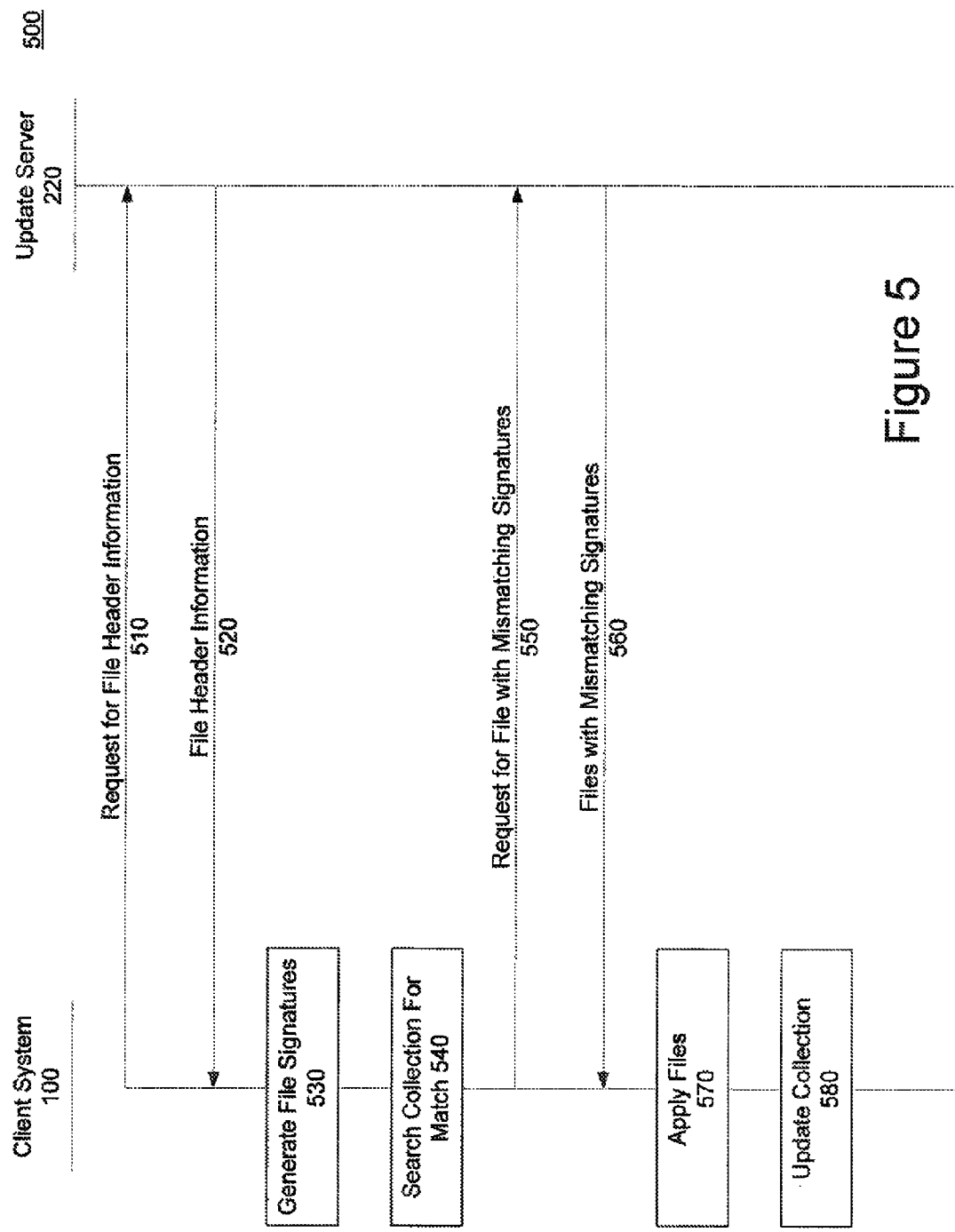

FIGS. 4-5 are flow diagrams that show example methods for the client system 100 to manage updates. Other examples perform the steps in different orders and/or perform different or additional steps than the ones shown.

Referring to FIG. 4, the client system 100 receives at 410 (e.g., from the update server 220) file header information for a computer file containing updating and/or configuration information, and generates at 420 a file signature for the computer file based on the file header information. The client system 100 determines at 430 whether the file signature is included in a collection of file signatures of computer files already applied in the client system 100 by searching the file signature in the collection for matches. If there is no match in the collection, the client system 100 determines at 430 that the corresponding computer file has not been applied in the client system 100, and applies at 440 the computer file to update and/or configure the client system 100. Otherwise, if there is at least one match, then the client system 100 determines at 430 that the computer file has already been applied in the client system 100 and thus does not need to be applied again.

Referring to FIG. 5, the client system 100 transmits at 510 to the update server 220 a request for file header information of one or more computer files (e.g., computer files in a current directory) hosted on the update server 220. In one example, the update server 220 runs a file server for providing update information, and the request is a command requesting header information for one or more computer files managed by the file server. The update server 220 transmits at 520 file header information of the requested computer files to the client system 100 in response to the request. The client system 100 generates at 530 file signatures for the computer files based on the file header information, and searches at 540 in a collection containing file signatures for computer files already applied in the client system 100 for matches. For those computer files with mismatching signatures (i.e., signatures not included in the collection), the client system 100 determines that the corresponding computer files have not been applied in the client system 100 before, and transmits at 550 to the update server 220 a request for such computer files. The update server 220 transmits at 560 the requested computer files back to the client system 100 in response to the request. The client system 100 applies at 570 the received computer files, and updates at 580 the collection to include the file signatures of these computer files.

Figure 6:
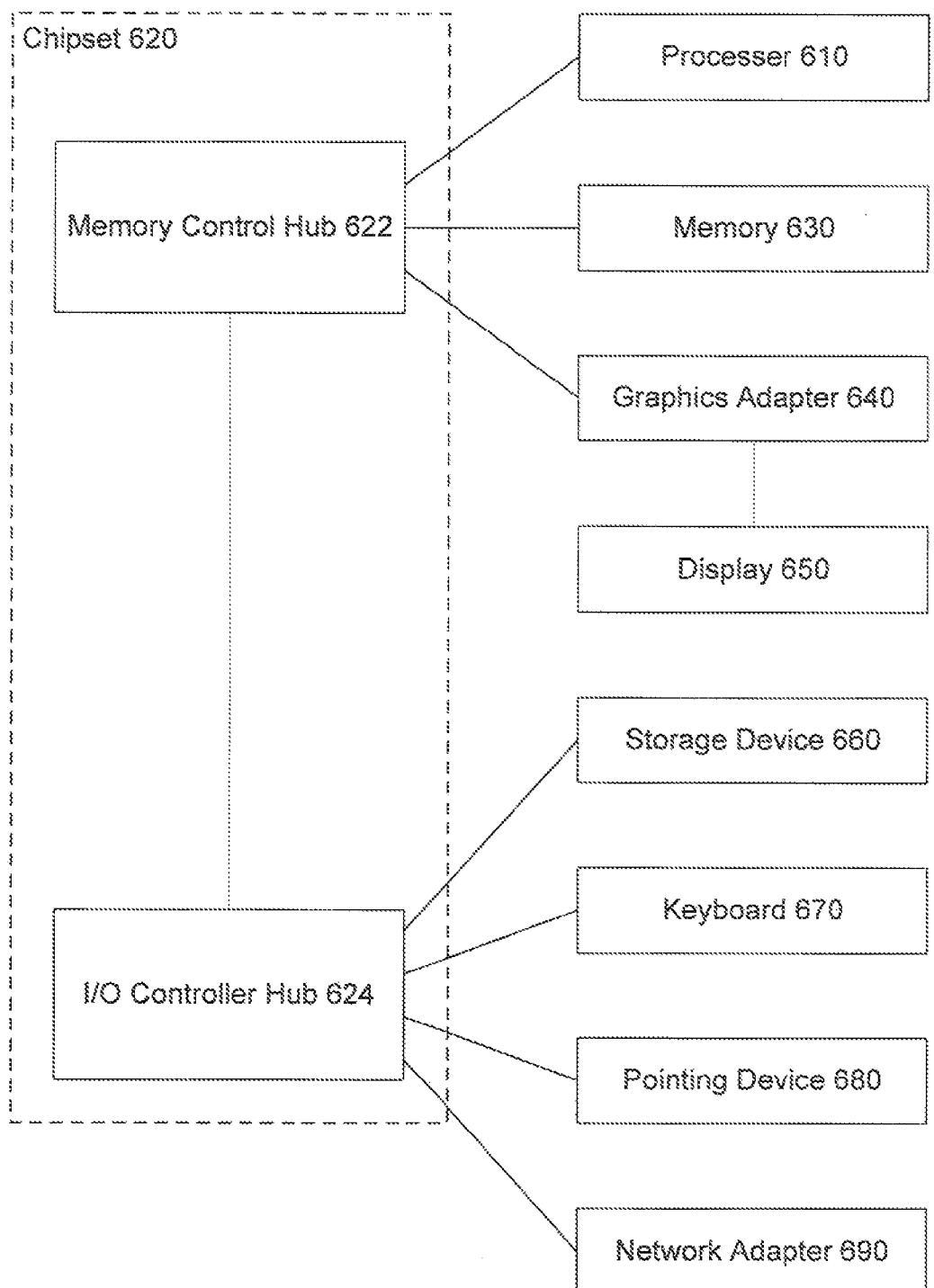
FIG. 6 is a diagram of an example of a computer system.

In one example, the entities shown in FIGS. 1-4 are implemented using one or more computer systems. FIG. 6 is a high-level block diagram illustrating an example computer system (also called a computing device) 600. The computer system 600 includes at least one processor 610 coupled to a chipset 620. The chipset 620 includes a memory controller hub 622 and an input/output (I/O) controller hub 624. A memory 630 and a graphics adapter 640 are coupled to the memory controller hub 622, and a display 650 is coupled to the graphics adapter 640. A storage device 660, a keyboard 670, a pointing device 680, and a network adapter 690 are coupled to the I/O controller hub 624. Other embodiments of the computer system 600 have different architectures.

The storage device 660 is a non-transitory computer-readable storage medium such as a hard drive, compact disk read-only memory (CD-ROM), DVD, or a solid-state memory device. The memory 630 holds instructions and data used by the processor 610. The pointing device 680 is a mouse, track ball, or other type of pointing device, and is used in combination with the keyboard 670 to input data into the computer system 600. The graphics adapter 640 displays images and other information on the display 650. The network adapter 690 couples the computer system 600 to one or more computer networks.

The computer system 600 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 660, loaded into the memory 630, and executed by the processor 610.

The types of computer systems 600 used by entities can vary depending upon the embodiment and the processing power required by the entity. For example, the update server 220 might comprise multiple blade servers working together to provide the functionality described herein. As another example, the client system 100 might comprise a mobile telephone with limited processing power. A computer system 600 can lack some of the components described above, such as the keyboard 670, the graphics adapter 640, and the display 650. In addition, one or more of the entities may be implemented in a cloud computing environment. As used herein, cloud computing refers to a style of computing in which dynamically scalable and often virtualized resources are provided as a service over the Internet.

One skilled in the art will recognize that the configurations and methods described above and illustrated in the figures are merely examples, and that the described subject matter may be practiced and implemented using many other configurations and methods. It should also be noted that the language used in the specification has been principally selected for readability and instructional purposes, and may not have been selected to delineate or circumscribe the inventive subject matter. Accordingly, the disclosure of the described subject matter is intended to be illustrative, but not limiting, of the scope of the subject matter, which is set forth in the following claims.

What is claimed is:

1. A method for managing updates on a computing device, comprising:
   receiving from a second computing device file header information of a file residing on the second computing device;
   generating a signature of the file based on the file header information;
   responsive to the signature being absent in a plurality of signatures, transmitting to the second computing device a request for the file from the second computing device and updating the computing device using the file.

2. The method of claim 1, further comprising:
   responsive to the signature being absent in the plurality of signatures, adding the signature into the plurality of signatures.

3. The method of claim 1, further comprising:
   transmitting to the second computing device a request for the file header information, wherein the file header information is received in response to transmitting the request for the file header information.

4. The method of claim 1, wherein the plurality of signatures comprise a signature of a file used to update the computing device.

5. The method of claim 1, wherein the file header information comprises a file name, a size, and a date associated with the file residing on the second computing device.

6. The method of claim 1, wherein generating the signature of the file comprises applying a hashing algorithm to the file header information to generate the signature.

7. The method of claim 1, wherein the generating of the signature of the file is by the computing device based on the file header information received from the second computing device.

8. The method of claim 1, wherein the file header information of the file received from the second computing device is separate from and precedes receipt of the file by the computing device.

9. The method of claim 1, wherein the file comprises software updates or software configuring information for the computing device.

10. A non-transitory computer-readable storage medium having computer program instructions recorded thereon for managing updates on a computing device, the computer program instructions comprising instructions for:
    receiving from a second computing device file header information of a file residing on the second computing device;
    generating a signature of the file based on the file header information;
    responsive to the signature being absent in a plurality of signatures, transmitting to the second computing device a request for the file from the second computing device and updating the computing device using the file.

11. The storage medium of claim 10, wherein the computer program instructions further comprises instructions for:
    responsive to the signature being absent in the plurality of signatures, adding the signature into the plurality of signatures.

12. The storage medium of claim 10, wherein the computer program instructions further comprises instructions for:
    transmitting to the second computing device a request for the file header information, wherein the file header information is received in response to transmitting the request for the file header information.

13. The storage medium of claim 10, wherein the plurality of signatures comprise a signature of a file used to update the computing device.

14. The storage medium of claim 10, wherein the file header information comprises a file name, a size, and a date associated with the file residing on the second computing device.

15. The storage medium of claim 10, wherein the second computing device comprises a file server, and the request for the file comprises a request for the file to the file server.

16. The storage medium of claim 10, wherein the computing device generates the signature of the file and wherein the file header information of the file received from the second computing device is separate from the file and is received by the computing device prior to receipt of the file by the computing device and prior to generation of the signature file by the computing device.

17. A computing device, comprising:
    a processor to execute a module to receive from a second computing device file header information of a file residing on the second computing device;
    generate a signature of the file based on the file header information;
    transmit to the second computing device a request for the file from the second computing device in response to the signature being absent in a plurality of signatures; and
    update the computing device using the file.

18. The computing device of claim 17, wherein the module is further configured to add, in response to the signature being absent in the plurality of signatures, the signature into the plurality of signatures.

19. The computing device of claim 17, wherein the module is further configured to transmit to the second computing device a request for the file header information, wherein the file header information is received in response to transmitting the request for the file header information.

20. The computing device of claim 17, wherein the plurality of signatures comprise a signature of a file used to update the computing device.

21. The computing device of claim 17, wherein the file header information comprises a file name, a size, and a date associated with the file residing on the second computing device.

22. The computing device of claim 17, wherein the second computing device comprises a file server, and the request for the file comprises a request for the file to the file server.

23. The computing device of claim 17, wherein the computing device generates the signature of the file and wherein the file header information of the file received from the second computing device is separate from the file and is received by the computing device prior to receipt of the file by the computing device and prior to generation of the signature file by the computing device.

\* \* \* \* \*